United States Patent

[11] 3,634,016

[72] Inventors John L. Rose, Jr.;
Richard L. Smith, both of Chattanooga, Tenn.
[21] Appl. No. 62,687
[22] Filed Aug. 10, 1970
[45] Patented Jan. 11, 1972
[73] Assignee Velsicol Chemical Corporation

[54] PROCESS FOR DYEING NATURAL AND SYNTHETIC POLYAMIDE FIBERS WITH ACID DYESTUFF AND COMPOSITION THEREFOR
13 Claims, No Drawings

[52] U.S. Cl.................................................. 8/54, 8/173
[51] Int. Cl..................................................... D06p 3/14
[50] Field of Search.......................................... 8/54, 174, 93, 94, 173

[56] References Cited
UNITED STATES PATENTS
1,723,271 8/1929 Ellis............................ 8/94 X
3,062,782 11/1962 Tapas et al.................... 260/47

OTHER REFERENCES
H. Bruson et al., JACS, 67, pp. 723–728, May. 1945, QD15A.
P. Bartlett et al., JACS, 68, pp. 6–8, Jan. 1946, QD15A.

Primary Examiner—George F. Lesmes
Assistant Examiner—T. J. Herbert, Jr.
Attorney—Robert J. Schwarz ABSTRACT: Composition and method for dyeing natural proteinaceous and synthetic polyamide fibers, particularly silk, wool and nylon, utilizing as dye assistants compounds of the formula

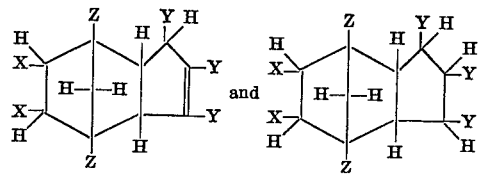

wherein one X is hydroxy and the second X is hydrogen or methyl, wherein each Y and Z are independently selected from the group consisting of hydrogen and methyl provided that a maximum of one X and Z is methyl and a maximum of one Y is methyl.

PROCESS FOR DYEING NATURAL AND SYNTHETIC POLYAMIDE FIBERS WITH ACID DYESTUFF AND COMPOSITION THEREFOR

This invention relates to the dyeing of natural proteinaceous and synthetic polyamide fibers. In particular it is directed to the dyeing of silk, wool and nylon.

The art of dyeing is a complex procedure requiring various techniques and chemicals. In particular, the dyeing of natural proteinaceous materials such as wool and silk, and synthetic polyamides, such an nylon, is preformed by the use of acid dyes. It is common to use these dyes in combination with assistants that improve the quality of dyeing and the utilization of dyestuffs. There are a number of products commercially used for this purpose, yet each of these has certain technical or economic drawbacks.

Consequently, it is an object of the present invention to devise an improvement in the dyeing of natural proteinaceous and synthetic polyamide fibers, particularly silk, wool and nylon.

It is another object of the present invention to devise compositions for dyeing that are useful in uniformly distributing the dye at the highest level of color.

It has now been found that by the use of the following compounds as dye assistants there is obtained substantial improvement in the uniformity of the dyeing and depth of color achieved. The compounds useful as dye assistants in accordance with the present invention are selected from compounds having the formula:

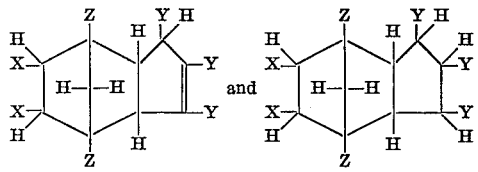

wherein one X is hydroxy and the second X is hydrogen or methyl wherein each Y and Z are independently selected from the group consisting of hydrogen and methyl provided that a maximum of one X and Z is methyl and a maximum of one Y is methyl.

A particularly useful compound is dicyclopentyl alcohol prepared as described by Bruson and Reiner JACS 67 p. 723, having the structural formula

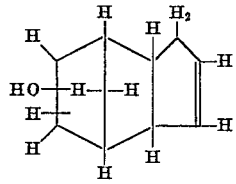

a boiling point of about 117° C. at 9 mm. Hg, a refractive index of about $N_D^{20}$ 1.5262 and an infrared spectrum having strong bands at about 9.4, 10.1, 12.7 and 14.4 microns. Further elucidation of the structure of this compound is discussed by Bartlett and Schneider, JACS 68 6, 1946.

Another compound useful in the present invention is 3a,4,5,6,7,7a-hexahydro-4,7-methanoindan-5-ol. This compound can be prepared by the hydrogenation of dicyclopentyl alcohol such as is described in U.S. Pat. No. 3,062,782, issued Nov. 6, 1962. This compound hereinafter will be referred to as "hydrogenated dicyclopentyl alcohol."

Other compounds within the scope of the present invention are 2-methyl-3a,4,5,6,7,7-hexahydro-4,7-methanoindan-5-ol, 6-methyl-3a,4,5,6,7,7-hexahydro-4,7-methanoindan-5-ol, 1-methyl-3a,4,5,6,7,7-hexahydro-4,7-methanoinden-5-ol, 4-methyl-3a,4,5,6,7,7-hexahydro-4,7-methanoinden-6-ol, etc.

The new dye assistants of the present invention are particularly useful in the dyeing of natural and synthetic fibers utilizing dyestuffs normally termed "acid dyes." The term "acid dyes" encompasses three types of dyestuffs, i.e., the simple acid dyes, mordant acid dyes and premetalized acid dyes.

The simple acid dyes fall into various chemical types such as nitro, as exemplified by CI Acid Yellow 1 (C.I. No. 10316) monoazo, as exemplified by CI Acid Red 1 (C.I. No. 18050); diazo, exemplified by CI Acid Red 89 (C.I. No. 23910), nitroso, exemplified by CI Acid Green 1 (C.I. No. 10020); monoazo, exemplified by CI Acid Orange 72 (C.I. No. 18740); triphenylmethane, exemplified by CI Acid Blue 7 (C.I. No. 42080); xanthrene, exemplified by CI Acid Violet 9 (C.I. No. 45190), anthraquinone, exemplified by CI Blue 45 (C.I. No. 63010); azine, exemplified by CI Acid Blue 59 (C.I. No. 50315) and quinoline, exemplified by CI Acid Yellow 3 (C.I. No. 47005).

The mordant acid dyes similarly fall into several chemical types, such as anthraquinone, exemplified by CI Mordant Red 3 (C.I. No. 58005); monoazo, exemplified by CI Mordant Red 7 (C.I. No. 18760); diazo, exemplified by CI Mordant Brown 1 (C.I. No. 20110); oxazine, exemplified by CI Mordant Violet 50; xanthene exemplified by CI Mordant Red 15; triphenylamine, exemplified by CI Mordant Blue 1 (C.I. No. 43830); nitroso, exemplified by CI Mordant Green 4; and naphthoquinone, exemplified by CI Mordant Brown 7.

The premetalized acid dyes are also divided into several types:

1:1 Metal complex dyes with sulfonic acid groups for solubility, exemplified by the Palatine Fast and the Neolan dyes; 1:1 metal complex with colorless complex builders but without sulfonic acid groups, exemplified by the Neopalatine dyes; 1:2 metal complex dyes with solubilizing groups, exemplified by Polar Grey BL; 1:2 metal complex neutral dyes, exemplified by Irgalan Grey BL (C.I. Acid Black 58).

The actual procedures for applying the dyestuffs to the fibers using the present dye assistants are identical to the standard procedures for the dyeing of natural and synthetic proteinaceous and polyamide fibers using standard acid dye formulations. For example, the dye composition can be applied by printing, padding or spraying onto the fabric, or by means of an immersion operation. The actual process conditions, such as temperature, pH, etc., are substantially the same as that employed in the art for currently favored systems.

Similarly, the dye composition can contain other additives normally used in dyeing with acid dyes. For example, thickeners such as methyl celluloses or natural gums are useful for certain applications. Other auxiliary materials can also be used such as sodium sulfate, ammonium sulfate, ammonium acetate, ammonium phosphate, methyl and ethyl lactate, methyl and ethyl tartrate, formic acid, acetic acid, hydrochloric acid, sulfuric acid, etc.

The compositions of the present invention contemplate a dye preparation containing as essential components an acid dyestuff useful in the dyeing of synthetic and natural fibers, including silk, wool and nylon, and the prescribed alcohols as an essential dye assistant. These compositions can have as optional additional components the aforedescribed additives, such as the thickeners, surfactants, and pH control agents. These additives are often used but the specific ones to be used and their amount can vary with the application.

Various amounts of the aforedescribed alcohols can be used in order to accomplish the results of the present invention. The use of excess dye assistant while possible, is actually wasteful since after an efficient amount has been used no additional beneficial results are achieved by the excess. For most purposes the essential dye assistant should be present in an amount of between about 0.25 and about 20 weight percent of the dye composition preferably between about 0.1 and about 10 weight percent of the dye composition.

The following examples illustrate the compositions and methods of the present invention, which are not limited thereto:

EXAMPLE 1

In order to demonstrate the effectiveness of the present compositions a series of experiments were performed using dicyclopentyl alcohol as the dye assistant at various concentrations, Irgalan Grey BL as the dye, and Polygum 260 as a thickener according to the following formulations:

| Component | Amount (cc.) |
|---|---|
| Dicyclopentyl alcohol | 0, 0.5, 1.0, 1.5, 2.0 |
| Polygum 260 (1% soln) | 25 |
| Formic Acid | 1.5 |
| Irgalan Grey BL (2% soln) | 25 |

The dicyclopentyl alcohol was preblended with 5 percent of its weight of an emulsifier. The mixtures were stirred for 15–20 minutes to effect homogeneous distribution of the components. Each mixture was padded onto a 5 gram swatch of knitted nylon 6/6 fiber. The padded nylon swatch was then passed between two rubber rollers to squeeze out excess mixture and to achieve an approximately 100-percent addition of the mixture to the nylon swatch. The padded swatches were then steamed at atmospheric pressure for 1 hour, followed by soaping, rinsing and air-drying. The aforedescribed procedure was repeated at the identical levels of dye assistant, with the substitution of benzyl alcohol for the dicyclopentyl alcohol.

An arbitrary scale was established wherein the lightest shade was assigned the rating of "0" and the darkest shade was assigned the rating of "10." The following observations were made:

| Dye Assistant | Amount (cc.) | Rating |
|---|---|---|
| Dicyclopentyl Alcohol | 0 | 0 |
| Dicyclopentyl Alcohol | 0.5 | 7 |
| Dicyclopentyl Alcohol | 1.0 | 10 |
| Dicyclopentyl Alcohol | 1.5 | 10 |
| Dicyclopentyl Alcohol | 2.0 | 10 |
| Benzyl Alcohol | 0 | 0 |
| Benzyl Alcohol | 0.5 | 1 |
| Benzyl Alcohol | 1.0 | 2 |
| Benzyl Alcohol | 1.5 | 4 |
| Benzyl Alcohol | 2.0 | 6 |

At corresponding levels of dye assistant, the depth of shade of the nylon dyed using dicyclopentyl alcohol constituted a substantial improvement over the depth of shade of the nylon dyed using benzyl alcohol as the dye assistant. In fact the nylon dyed using the highest level of benzyl alcohol (2.0 cc.) did not give a dye shade as deep as did the lowest level of dicyclopentyl alcohol (0.5 cc.) Furthermore, the dye shade attained by the use of 2.0 cc. of dicyclopentyl alcohol was much deeper than that attained with the use of the same amount of benzyl alcohol.

EXAMPLE 2

Dye pastes were prepared according to the foregoing example, but using Supralan Yellow NR (C.I. No. 18690) as the dye. These pastes were padded onto knitted nylon 6 fiber and pressed to achieve 100 percent add-on as previously described. After steaming, soaping, washing and drying the depth of color of the swatches was rated in a manner similar to the previous example. The following observations were made:

| Dye Assistant | Amount (cc.) | Rating |
|---|---|---|
| Dicyclopentyl Alcohol | 0 | 0 |
| Dicyclopentyl Alcohol | 0.5 | 9 |
| Dicyclopentyl Alcohol | 1.0 | 10 |
| Dicyclopentyl Alcohol | 1.5 | 10 |
| Dicyclopentyl Alcohol | 2.0 | 10 |
| Benzyl Alcohol | 0 | 0 |
| Benzyl Alcohol | 0.5 | 1 |
| Benzyl Alcohol | 1.0 | 4 |
| Benzyl Alcohol | 1.5 | 8 |
| Benzyl Alcohol | 2.0 | 10 |

EXAMPLE 3

Dye pastes were prepared according to the following formulations:

| Dye Assistant | as indicated below |
|---|---|
| Polygum 260 (1% soln) | 25 cc. |
| Supralan Brown NR (2% soln) (C.I. Acid Brown 31) | 25 cc. |
| Formic Acid | 1.5 cc. |

Several pastes were prepared using known dye assistants. These pastes were compared with a paste using dicyclopentyl alcohol. The dye pastes were padded onto knitted nylon 6, and the samples processed as previously described. The ratings were determined as in the previous examples with the following results:

| Dye Assistant | Amount | Rating |
|---|---|---|
| Cibaphasol AS | 0.5 cc. | 0 |
| Cibaphasol AS | 2.0 cc. | 0 |
| thiodiglycol / urea | 3 c.c. / 5 g. | 1 |
| 2-ethoxy ethanol / urea | 3 cc. / 5 g. | 2 |
| thiourea | 5% | |
| thiodiglycol | 5% | 4 |
| 2-butoxy ethanol | 5% | |
| benzyl alcohol | 2% | 4 |
| benzyl alcohol | 3% | 5 |
| benzyl alcohol | 4% | 7 |
| dicyclopentyl alcohol | 1% | 10 |

Additional experiments were performed with other dyes, including Capracyl Orange and Irgalan Red 2 BL. Each of these experiments verified the conclusions that dicyclopentyl alcohol provides excellent depth of shade and levelling, generally superior to that obtained with commonly used dyeing assistants.

EXAMPLE 4

In order to make certain that the emulsifier is not critical to the performance of the present dyeing assistants, various emulsifiers were utilized in a series of experiments. Since emulsifiers applicable to acid dyeing procedures are generally classified as being anionic or nonionic examples of each classification were used at various levels based on the weight of dicyclopentyl alcohol. Also certain combinations of emulsifiers were used as follows:

| Emulsifier | Type | Percent weight of dye assistant |
|---|---|---|
| ATLOX 3406 | Anionic/nonionic | 5 |
| Do | do | 10 |
| Do | do | 20 |
| Span 20 | Nonionic | 5 |
| Do | do | 20 |
| ATLOX 3403 | do | 10 |
| Do | do | 20 |
| ATLOX 3404 | Anionic | 5 |
| Do | do | 20 |
| TRYLOX 3300P | do | 10 |
| Do | do | 20 |
| ATLOX 3403/ATLOX 3404 | Ratio 3:1 | 10 |
| Do | do | 15 |
| Do | do | 20 |
| TRYDET 3300P/TRYLOX CO-40 | do | 5 |
| Do | do | 10 |
| Do | do | 20 |
| Do | do | 10 |
| Do | do | 15 |

The ATLOX emulsifiers are products of Atlas Chemical Industries and are polyoxyethylene derivatives and blends with alkyl aryl sulfonates.

Span 20 is a product of the Atlas Chemical Industries and is Sorbiton monolaurate.

TRYLOX CO–40 is a product of Trylon Chemical Industries, Inc. and is an ethoxylated caster oil.

TRYDET 3300P is a product of Trylon Chemical Industries, Inc. and is polyoxyethylene derivatives of fatty acid.

Using Supralan Yellow NR as the dye, experiments were carried out as described in example 2. The processed fiber swatches were examined for any modification of the effectiveness of the dicyclopentyl alcohol. It is recognized that excessive amounts of anionic surfactants can retard the development of color in dyeing with acid dyes. It was concluded that neither the type or amount of emulsifier is critical to the effectiveness of dicyclopentyl alcohol. For normal applications the emulsifier should be present in an amount of between about 2 and 25 weight percent of the dye assistant, preferably between about 5 and 20 weight percent.

As previously stated, the present composition can contain thickeners. Thickeners commonly used in preparing pastes with acid dyes are useful in the present compositions in the normal quantities. In order to substantiate this, additional mixtures within the present composition were prepared using a polysaccharide gum, sold under the trademark KELZAN, a trademark of Kelco Co., and compared with a similar composition prepared using as a thickener Polygum 260, a trademark of Polymer Industries, Inc., for sodium alginate.

EXAMPLE 5

Using Irgalan Green 3 GL as the dye pastes were prepared as described in example 1. Swatches of nylon 6 were dyed and processed in accordance with the methods described in this example. Dicyclopentyl alcohol and benzyl alcohol were used alternately as the dye assistants. The rating were determined as in the previous examples with the following results:

| Dye Assistant | KELZAN | POLYGUM 260 |
|---|---|---|
| None | 0 | 0 |
| Benzyl Alcohol (3%) | 5 | 3 |
| Dicyclopentyl Alcohol (2%) | 10 | 10 |

The amount of thickener used in dye pastes will vary, depending on the type of dye, the method of application, and the construction of the fabric to be dyed. Pastes used for screen printing will usually be thicker than those used for roller work. Heavy staple fabrics require a thinner paste than would be employed in printing sheer, filament constructions. Normally the thickener would be present in concentrations from about 0.25 percent to about 2 percent of the weight of the total dye paste.

We claim:

1. A dye composition which comprises an acid dyestuff and a dye assistant selected from

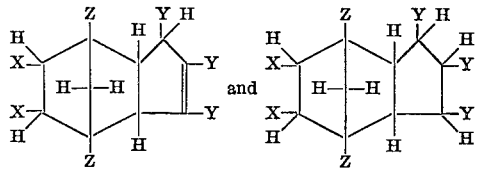

wherein one X is hydroxy and the second X is hydrogen or methyl, wherein each Y and Z are independently selected from the group consisting of hydrogen and methyl provided that a maximum of one X and Z is methyl and a maximum of one Y is methyl.

2. The composition of claim 1 wherein the dye assistant is

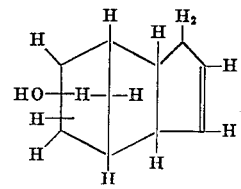

having a boiling point of about 117° C. at 9 mm. Hg, a refractive index of about $N_D^{20}$ 1.5262 and an infrared spectrum having strong bands at about 9.4, 10.1, 12.7 and 14.4 microns.

3. The composition of claim 1 wherein the dye assistant is 3a,4,5,6,7,7a-hexahydro-4,7-methanoindan-5-ol.

4. The composition of claim 1 wherein the dye assistant is present in a quantity between about 0.25 and about 20 weight percent of the composition.

5. An improvement in the process for the dyeing of natural proteinaceous and synthetic polyamide fibers with acid dyes which comprises applying thereto the dye composition of claim 1.

6. An improvement in the process for the dyeing of natural proteinaceous and synthetic polyamide fibers which comprises applying thereto the composition of claim 2.

7. An improvement in the process for the dyeing of natural proteinaceous and synthetic polyamide fibers which comprises applying thereto the composition of claim 3.

8. The process of claim 5 wherein the natural proteinaceous fiber is wool.

9. The process of claim 5 wherein the natural proteinaceous fiber is silk.

10. The process of claim 5 wherein the synthetic polyamide fiber in nylon.

11. The process of claim 6 wherein the natural proteinaceous fiber is wool.

12. The process of claim 6 wherein the synthetic polyamide fiber is silk.

13. The process of claim 6 wherein the synthetic polyamide fiber is nylon.

* * * * *